H. ANDERSEN.
SAW SET.
APPLICATION FILED MAR. 3, 1914.
1,111,348.
Patented Sept. 22, 1914.
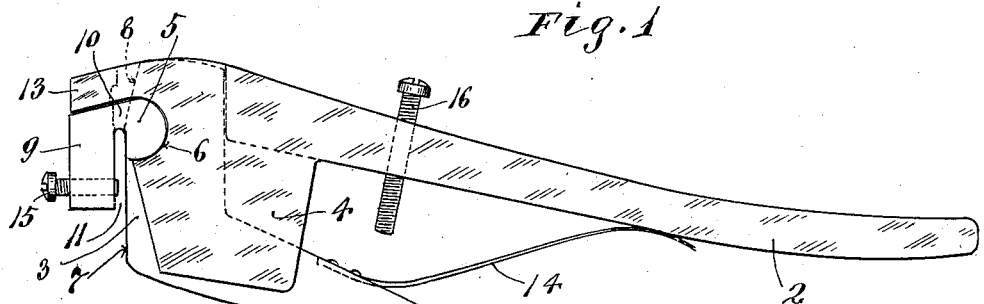
Fig. 1
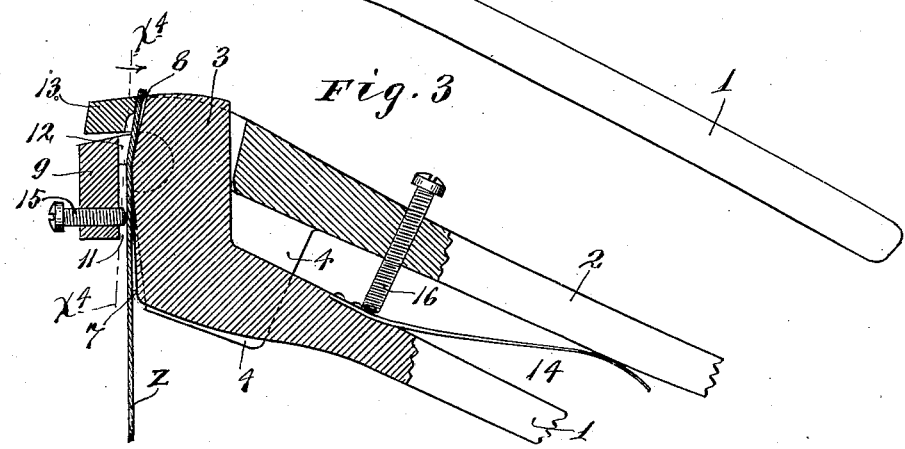
Fig. 3
Fig. 2
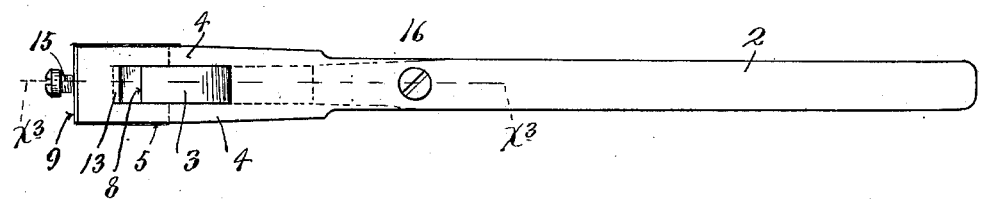
Fig. 4
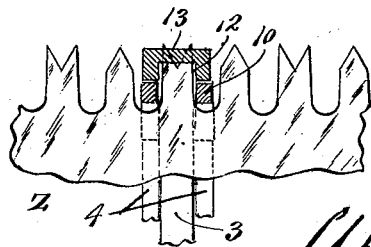
Witnesses.
A. H. Opsahl.
E. C. Skinkle
Inventor
Hans Andersen
By his Attorneys
Williamson Merchant

UNITED STATES PATENT OFFICE.

HANS ANDERSEN, OF NYMORE, MINNESOTA.

SAW-SET.

1,111,348.   Specification of Letters Patent.   Patented Sept. 22, 1914.

Application filed March 3, 1914.   Serial No. 822,112.

*To all whom it may concern:*

Be it known that I, HANS ANDERSEN, a citizen of the United States, residing at Nymore, in the county of Beltrami and State of Minnesota, have invented certain new and useful Improvements in Saw-Sets; and I do hereby declare the following to be a full, clear, and exact description of the invention, such as will enable others skilled in the art to which it appertains to make and use the same.

My invention has for its object to provide a simple and highly efficient saw-set, and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a view in side elevation of the improved saw-set; Fig. 2 is a plan view of the same; Fig. 3 is a view chiefly in longitudinal section, taken on the line $x^3$ $x^3$ of Fig. 2, showing the saw-set applied in working position to a saw; and Fig. 4 is a view in transverse section, taken on the line $x^4$ $x^4$ of Fig. 3.

The numerals 1 and 2 indicate a pair of levers having integrally formed therewith an anvil block 3 and a pair of laterally spaced depending side plates 4, respectively.

The levers 1 and 2 are fulcrumed, one on the other, by means of a pair of diametrically opposite trunnions 5, integrally formed on the sides of the anvil block 3, and are loosely mounted in open seats 6 formed in the front edges of the side plates 4. As shown, the side plates 4 embrace the anvil block 3 and work slidably thereover. On its outer face, the anvil block 3 is formed with two surfaces 7 and 8 that extend at an angle one to the other. Extending parallel with the anvil surface 7 is a presser bar 9 rigidly secured, at its upper portion, to the anvil block 3 by a pair of arms 10. This presser bar 9 is spaced apart from the anvil block 3, to afford a saw blade passage 11 below the arms 10, adjacent to the anvil surface 7, and a saw tooth passage 12, between said arms and adjacent to the working face 8 of said anvil.

As shown in Figs. 3 and 4, the lower portion of the blade of the saw Z extends into the passage 11, and one of its teeth extends into the passage 12. As is evident, the arms 10 afford stops to properly position the saw teeth in respect to the working surface of the anvil block. A set bar 13, arranged for coöperation with the working face 8 of the anvil, extends between the forward ends of the side plates 4 and is integrally formed therewith.

By gripping the levers 1 and 2 in the hand, and pressing the same together, the working face 8 of the anvil and the set bar 13 may be forced into contact, one with the other. A flat leaf spring 14 is anchored at one end to the lever 1, and its free end loosely bears against the lever 2, thereby yieldingly holding said levers separated. When the levers 1 and 2 are separated, the set bar 13 is also out of contact with the working surface 8 of the anvil.

An adjusting screw 15, having screw-threaded engagement with the presser bar 9, extends into the saw blade passage 11, and affords means for varying the width of said passage. The amount of set to be given to a saw may be varied by means of a long set screw 16, having screw-threaded engagement with the lever 2, and with its inner end arranged to impinge against the lever 1, thereby limiting the closing movement of the levers 1 and 2. By thus adjusting the levers 1 and 2, the movement of the set bar 13 toward the working face 8 of the anvil will also be varied, depending on the set to be given the saw.

By gripping the levers 1 and 2 in the hands and forcing the same toward each other, against the tension of the spring 14, the set bar 13 will engage the teeth of the saw, overlying the working surface 8 of the anvil block. The saw tooth thus engaged will be drawn toward the working surface 8 of the anvil, thereby bending said tooth over the shoulder, formed between the two surfaces 7 and 8 of the anvil block. During the bending of the saw teeth, the saw blade will engage the set screw 15, which acts as a base of resistance therefor.

What I claim is:—

1. A saw-set comprising a pair of fulcrumed levers, one of which carries an anvil block having a saw passage and a working face that is at an angle to said saw passage, and the other of which carries a set bar embracing said anvil block adapted to engage and draw a saw tooth onto the working face of said anvil block.

2. A saw-set comprising a pair of spring-separated levers, one of said levers carrying an anvil block having a pair of diametrically opposite trunnions, and the other of said levers having a pair of side plates embracing said anvil block, said side plates having open seats in which said trunnions are mounted, said anvil block having a saw blade passage, a saw tooth passage, and a working face that is at an angle to said saw blade passage, a set bar carried by said side plates for coöperation with the working face of said anvil block, a set screw carried by one of said levers, for limiting the closing movement of said levers, and a second set screw extending into the said saw blade passage.

In testimony whereof I affix my signature in presence of two witnesses.

HANS ANDERSEN.

Witnesses:
 HARRY D. KILGORE,
 F. D. MERCHANT.

Copies of this patent may be obtained for five cents each, by addressing the "Commissioner of Patents, Washington, D. C."